Oct. 14, 1952     J. P. LEWIS ET AL     2,613,483
LAWN MOWER SHARPENING DEVICE

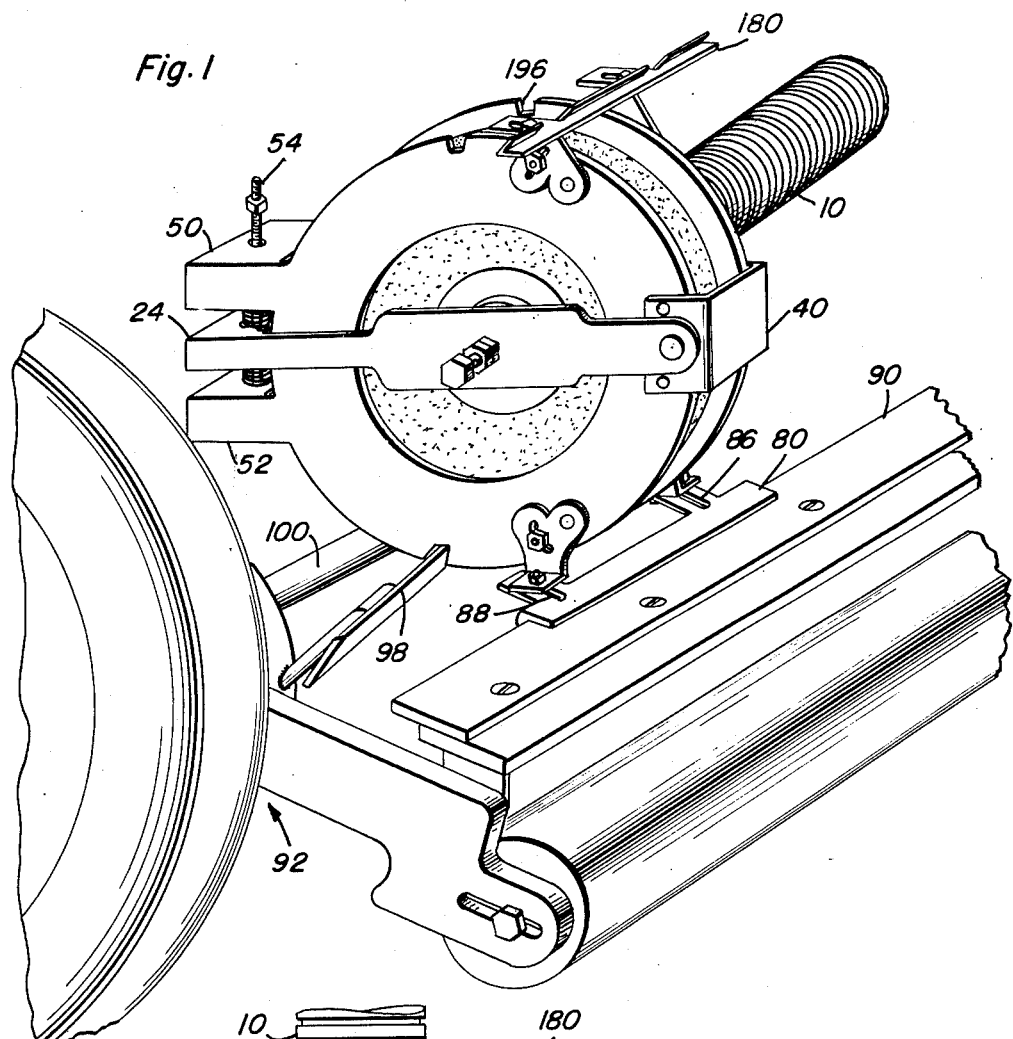
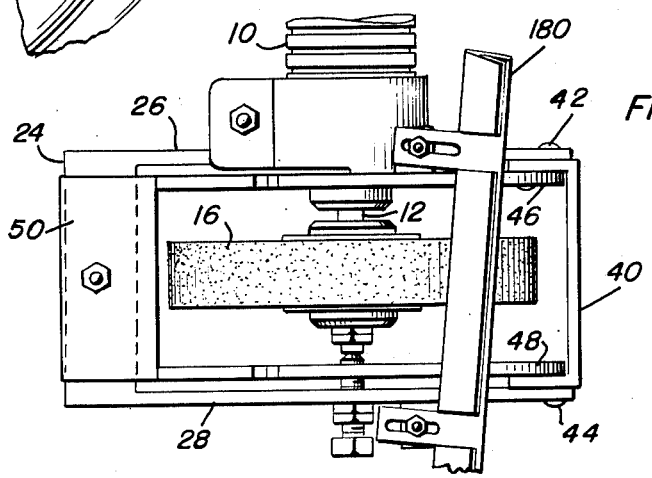

Filed Oct. 8, 1951     2 SHEETS—SHEET 2

James P. Lewis
Ralph R. Rader
INVENTORS.

Patented Oct. 14, 1952

2,613,483

UNITED STATES PATENT OFFICE 2,613,483

LAWN MOWER SHARPENING DEVICE

James P. Lewis and Ralph R. Rader, Howard, Kans.

Application October 8, 1951, Serial No. 250,264

5 Claims. (Cl. 51—173)

This invention relates to a lawn mower sharpener, and particularly for a sharpener to be held in the hand of a mechanic while sharpening a lawn mower.

For a lawn mower to do good work, it is necessary that the cutting reels and the stationary cutting bar shall be sharp and square and shall meet perfectly and evenly all the way along the length. To secure such meeting, it is necessary that the wheel which sharpens the cutting reel blades shall be definitely and accurately spaced in predetermined relation to the cutter bar. Difficulty has heretofore been experienced in securing the necessary angular relation between the cutting face of the sharpening wheel and the face of the cutting bar and the cutting reel knife.

The present invention provides a device in which an angular guide engages the edge of the stationary cutting bar and positions the base of a cutting wheel with relation to the knife of the cutting reel so that the edge of the knife of the cutting reel is cut to a definite shape with respect to the face of the stationary cutter bar.

It is an object of the present invention to provide an improved lawn mower sharpener.

It is a further object of this invention to provide a lawn mower sharpener in which the wheel is definitely positioned with respect to the cutter bar.

A further object of this invention is to provide a lawn mower sharpener which can be held in the hand of an operator.

It is a further object of this invention to provide a lawn mower sharpener driven by a flexible shaft and having means for accurately adjusting the position of the wheel with respect to the cutting surface.

Other objects and many of the attendant advantages of this invention will be apparent from the following detailed description, taken in conjunction with the accompanying drawings, in which:

Figure 1 is a perspective view of a lawn mower sharpener applied in sharpening position;

Figure 2 is a top plan view of the sharpener;

Figure 4:
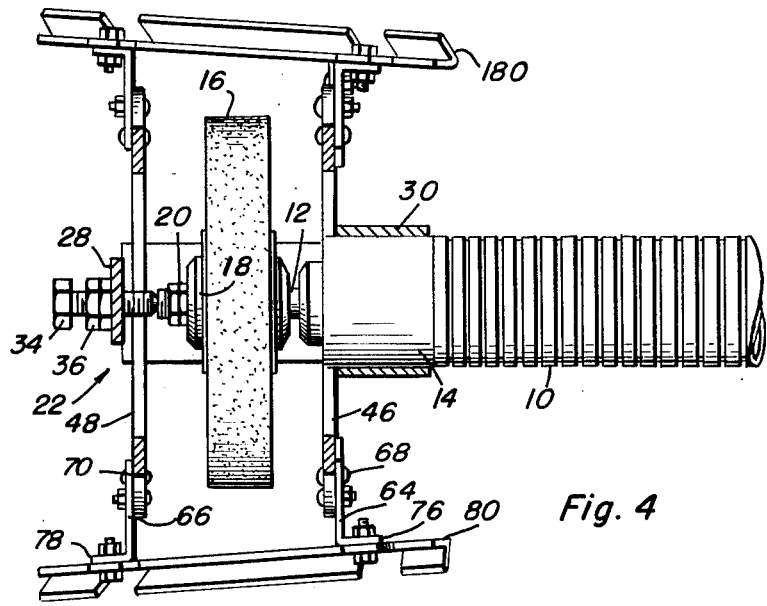
Figure 4 is a sectional view taken substantially on the plane indicated by the line 4—4 of Figure 3 and showing the relation of the parts of the sharpener.
Figure 3:
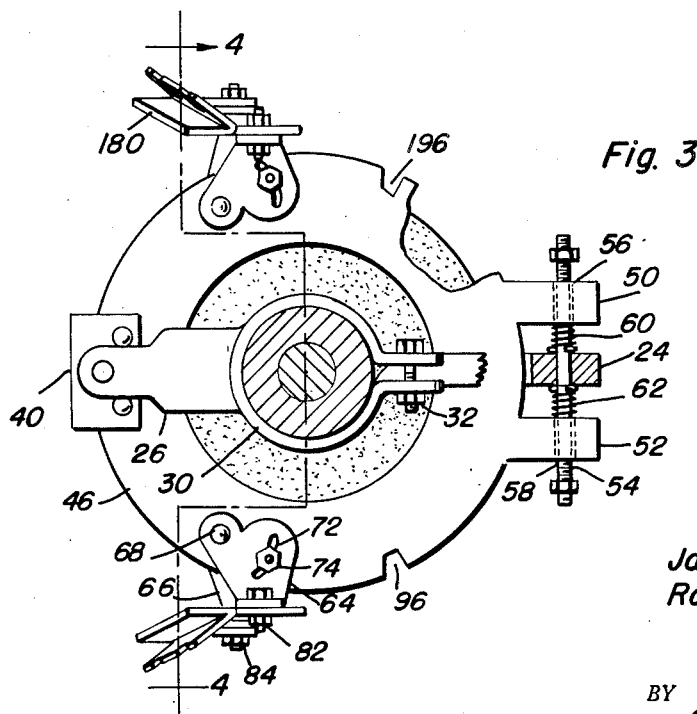
Figure 3 is an end view of parts broken away and in section.

In an exemplary embodiment of the lawn mower sharpener, a flexible housing 10 encloses a flexible power shaft, not shown. A rigid tip 12 is connected to the flexible shaft and extends beyond the end of the housing 10, while the housing 10 is provided with a substantially rigid terminal 14. A grinding wheel 16 is firmly fixed on the tip 12 by means of the chuck 18 and the lock nuts 20. The U-shaped frame 22 has a base 24 and laterally extending arms 26 and 28. The arm 26 has an annular split clamp 30 which embraces the terminal 14 and is detachably but firmly connected thereto by means of the bolt 32. The arm 28 has a bearing stud 34 mounted therein, being firmly positioned with respect to the arm by means of lock nuts 36. The end of the stud 34 is shaped to engage the end of the tip 12 so that the tip 12 is properly engaged and supported by means of the bearing stud 34. The wheel 16 is therefore rigidly mounted in a frame 22 by means of the tip 12, the outer end of which is supported by the bearing stud 34 which is firmly mounted in the frame 22. A U-shaped bracket 40 is pivotally connected to the open end of the frame 22 by means of studs 42 and 44, while rigidly attached to the bracket 40 is a pair of annular guard plates 46 and 48 which lie substantially parallel to the sides of the cutting wheel 16. At the side opposite the bracket 40, the plates 46 and 48 are connected together by means of a pair of transverse lugs 50 and 52. The lugs 50 and 52 extend on opposite sides of the base 24 of the frame 22 and the base 24 is provided with a bolt or pin 54 which is fixed in the base 24 and extends loosely through openings 56 and 58 in the lugs 50 and 52. Compression springs 60 and 62 are interposed between the lugs 50 and 52 and the base 24 so that the guard plates 46 and 48 are resiliently urged to a seating or guarding position with respect to the wheel 16. The springs further act as a shock absorber so that the guard plates are resiliently supported with respect to the frame and the cutting wheel.

A pair of ears 64 and 66 are mounted on the annular guard plates 46 and 48 by means of rivets 68 and 70. The ears 64 and 66 are provided with arcuate slots 72 engaged by bolts 74 so that the ears may be adjusted angularly with respect to the guard plates 46 and 48. The ears 64 and 66 are provided with annular flanges 76 and 78 to which is connected a guide channel 80 by means of bolts 82 and 84. The guide channel 80 is provided with slots 86 and 88 for cooperation with the bolts 82 and 84 so that the guide channel may be angularly or laterally adjusted with respect to the guide plates 46 and 48. The guide channel 80 is adapted to engage the stationary cutter bar 90 of a lawn mower indicated generally at 92. The annular guard plate is provided with twin slots 96 for receiving the rotating blade 98 of the cutter reel 100. Since the cutter reels come in various diameters and various sweep of curvature, it is necessary to adjust the wheel for each type of cutter reel bar.

In operation, the twin grooves 96 will be applied to the bar 98 while the channel 80 is applied to the stationary bar 90 and the ears and the channel will be adjusted and fixed in position so that the wheel 16 moves directly diametrically across the face of the cutter reel bar. During the sharpening operation, the bar 80 is slid along the cutter bar 90 and the reel will turn so that the reel cutter bar 98 will always be properly presented to the face of the cutting wheel 16. Since cutter bars come in various curvatures and both left and right curvatures, it is necessary to prove a channel 180, twin grooves 196 for cooperation with left hand type of reels. The adjustment for the bars 180 and the slots 196 is identical with the similar adjustment of the bar 80 and the slots 96. Therefore, it will not be necessary to further describe the adjustments.

While for purposes of illustration a preferred embodiment of the invention has been shown and described according to the present understanding thereof, it will be apparent that changes and modifications may be made therein without departing from the true spirit of the invention.

Having described the invention, what is claimed as new is:

1. A lawn mower sharpener comprising a flexible housing, a flexible power shaft in said housing, a rigid tip on said shaft projecting from said housing, a terminal on said housing, a U-shaped frame, one leg of said U-shaped frame being detachably, rigidly mounted on said terminal, said rigid tip projecting into said frame, a grinding wheel mounted on said tip, a bearing stud mounted in the other leg of said frame, said stud engaging the end of said rigid tip, a U-shaped bracket pivotally mounted across the open end of said frame, a pair of substantially annular guard plates secured on said bracket and extending in substantially parallel relation to said wheel, an annular guide channel adjustably mounted on said guard plates, said guide channel adapted to engage a bar to determine the angular relation of said wheel to said bar, twin notches in said guard plates to present a cutter bar to said wheel.

2. A lawn mower sharpener comprising a flexible housing, a flexible power shaft in said housing, a rigid tip on said shaft projecting from said housing, a terminal on said housing, a U-shaped frame, one leg of said U-shaped frame being detachably, rigidly mounted on said terminal, said rigid tip projecting into said frame, a grinding wheel mounted on said tip, a bearing stud mounted in the other leg of said frame, said stud engaging the end of said rigid tip, a U-shaped bracket pivotally mounted across the open end of said frame, a pair of substantially annular guard plates secured on said bracket and extending in substantially parallel relation to said wheel, an annular guide channel adjustably mounted on said guard plates, said guide channel adapted to engage a bar to determine the angular relation of said wheel to said bar, twin notches in said guard plates to present a cutter bar to said wheel, a pair of spaced lugs connecting said guard plates, and resilient means urging said plates to a predetermined relation with said U-shaped frame.

3. A lawn mower sharpener comprising a flexible housing, a flexible power shaft in said housing, a rigid tip on said shaft projecting from said housing, a terminal on said housing, a U-shaped frame, one leg of said U-shaped frame being detachably, rigidly mounted on said terminal, said rigid tip projecting into said frame, a grinding wheel mounted on said tip, a U-shaped bracket pivotally mounted across the open end of said frame, a pair of substantially annular guard plates secured on said bracket and extending in substantially parallel relation to said wheel, an annular guide channel adjustably mounted on said guard plates, said guide channel adapted to engage a bar to determine the angular relation of said wheel to said bar, twin notches in said guard plates to present a cutter bar to said wheel.

4. A lawn mower sharpener comprising a flexible power shaft, a housing for said shaft, the tip of said shaft extending from said housing, a grinding wheel mounted on said tip, a U-shaped frame attached to said housing and embracing said wheel, a pair of annular guard plates pivotally attached to said frame adjacent the open end thereof, a guide channel adjustably mounted on said guard plates, twin guide notches in said guard plates, resilient means positioning said guard plates with respect to said frame.

5. A lawn mower sharpener comprising a flexible power shaft, a housing for said shaft, the tip of said shaft extending from said housing, a grinding wheel mounted on said tip, a U-shaped frame attached to said housing and embracing said wheel, a pair of annular guard plates pivotally attached to said frame adjacent the open end thereof, a guide channel adjustably mounted on said guard plates, twin guide notches in said guard plates, a pair of spaced apart lugs joining said guard plates together to pivot as a unit, said lugs extending on opposite sides of the base of the U-shaped frame, a guide bolt secured in the base of said frame and loosely engaging said lugs, and compression springs interposed between each of said lugs and the base of said frame.

JAMES P. LEWIS.
RALPH R. RADER.

REFERENCES CITED

The following references are of record in the file of this patent:

UNITED STATES PATENTS

| Number | Name | Date |
|---|---|---|
| 1,291,982 | Madsen | Jan. 21, 1919 |
| 1,968,609 | Madsen | July 31, 1934 |
| 2,441,045 | Toepfer | May 4, 1948 |